United States Patent [19]

Itoh

[11] Patent Number: 5,528,306

[45] Date of Patent: Jun. 18, 1996

[54] VIDEO SIGNAL PROCESSING CIRCUIT FOR CONVERTING DIGITAL COLOR DIFFERENCE SIGNALS INTO A CARRIER CHROMINANCE SIGNAL

[75] Inventor: Tamotsu Itoh, Noda, Japan

[73] Assignee: Victor Company of Japan, Ltd., Yokohama, Japan

[21] Appl. No.: 453,011

[22] Filed: May 30, 1995

[30] Foreign Application Priority Data

May 31, 1994 [JP] Japan .................................. 6-141019

[51] Int. Cl.$^6$ ...................................................... H04N 11/20
[52] U.S. Cl. ........................................... 348/453; 348/458
[58] Field of Search ..................................... 348/441, 453, 348/455, 458, 459; H04N 11/20, 11/24

[56] References Cited

U.S. PATENT DOCUMENTS 4,335,393  6/1982  Pearson ................................. 348/455
5,249,038  9/1993  Stec ........................................ 348/453
5,444,495  8/1995  Takahama et al. ..................... 348/458

FOREIGN PATENT DOCUMENTS 4-189023  7/1992  Japan .

Primary Examiner—Victor R. Kostak
Attorney, Agent, or Firm—Michael N. Meller

[57] ABSTRACT

A video signal processing circuit capable of converting digital color difference signals directly into a carrier chrominance signal is described. The processing circuit includes a first flip-flop for latching the first sampling clock signal of the first and second color difference signals with a second sampling clock signal having a frequency which is an integer multiple of a subcarrier frequency of the carrier chrominance signal to be produced, second and third flip-flops for respectively latching the first and second color difference signals with a third sampling clock signal obtained from the first flip-flop, and carrier chrominance signal generating circuit for generating the carrier chrominance signal from the first and second color difference signals outputted from the second and third flip-flops.

6 Claims, 4 Drawing Sheets

VIDEO SIGNAL PROCESSING CIRCUIT FOR CONVERTING DIGITAL COLOR DIFFERENCE SIGNALS INTO A CARRIER CHROMINANCE SIGNAL

BACKGROUND OF THE INVENTION

1. Field of the Invention

The present invention relates to a video signal processing circuit for converting a digital component color television signal into a luminance signal and a carrier chrominance signal which can be received by a television receiver of NTSC system and, particularly, to a video signal processing circuit capable of easily converting a digital color difference signal into a carrier chrominance signal.

The MUSE-NTSC converter (referred to as M-N converter, hereinafter) is an example of a circuit which outputs a digital component video signal. The term "MUSE signal" means a high definition television signal encoded by the MUSE system which is one of the transmission standards for high definition television systems and is a video signal band compressing system developed by NHK (Japan Broadcasting Corporation. The M-N converter functions to decode the MUSE signal and convert it into the NTSC television signal. The M-N converter will be described as an example of the video signal processing circuit for converting the digital component color television signal into the luminance signal and the carrier chrominance signal which can be received by the conventional NTSC television receiver.

2. Description of the Prior Art

FIG. 3 is a block diagram of the conventional M-N converter. In FIG. 3, a MUSE signal is supplied to, an input terminal 1 and then to an A/D converter 2. The A/D converter 2 is supplied with a clock signal CK1 of 16.2 MHz outputted from a MUSE decoding processor 3 as a sampling clock signal. A digital MUSE signal outputted from the A/D converter 2, which is sampled at a rate of 16.2 MHz and quantized, is inputted to the MUSE decoding processor 3. Since the horizontal scanning frequency of the high definition television signal is 33.75 kHz, the digital MUSE signal sampled at the rate of 16.2 MHz has a data of 480 pixels per 1H (horizontal scanning period).

The MUSE decoding processor 3 decodes the input digital MUSE signal and outputs it as the high definition television signal whose video signal frequency band is restored. In this example, the sampling rate becomes 32.4 MHz by this decoding process and the number of pixels in 1H becomes 960. Further, the number of effective image pixels in 1H is 748 which is about 78% of 960 pixels.

The high definition television signal outputted from the MUSE decoding processor 3 is supplied to a scanning line converter 4 in which the horizontal scanning period and the number of scanning lines are converted, resulting a digital luminance signal Y and digital color difference signals R-Y and B-Y.

There are some conversion modes in an image conversion method for displaying the high definition television signal having an aspect ratio of 16:9 on a conventional television receiver having a screen having an aspect ratio of 4:3. Among them, a zoom mode for converting an image of aspect ratio of 16:9 into an image of aspect ratio of 4:3 by cutting away both side portions of the 16:9 image as shown in FIG. 4, will be described.

In the zoom mode, 1125 scanning lines of the high definition television signal is converted into 525 scanning lines which are 7/15 of the scanning lines of the high definition television signal.

In this example, 748 effective image pixels per 1H in the high definition television signal is converted into 560 pixels per 1H, which are ¾ of 780 pixels, since ⅛ of the image is cut out on each side in the zoom mode.

Since, in the NTSC signal, the ratio of effective image pixels in 1H is about 84%, the total number of pixels in 1H is 668. Since the horizontal sync frequency of the NTSC signal is 15.75 kHz, a sampling clock signal CK2 for the luminance signal is 15.75 (kHz)×668 (pixels)=10.52 MHz. In this example constructed as the M-N converter, the frequency range of color signal is a half of that of the luminance signal. Therefore, a frequency of sampling clock signal CK3 of the color difference signal is 5.26 MHz. A ratio of the clock signals CK1 to CK3 is 3600 to 1169. Based on the clock signal CK1 supplied from the MUSE decoding processor 3, the scanning line converter 4 generates the clock signals CK2 and CK3 by means of PLL circuit not shown.

In order to make the digital component video signal composed of Y, R-Y and B-Y which are outputted from the scanning line converter 4 receivable by the conventional television receiver, it must be converted into an analog luminance signal and an analog carrier chrominance signal.

In this view point, the digital luminance signal Y outputted from the scanning line converter 4 is converted into an analog luminance signal Y by a D/A converter 14 and the digital color difference signals R-Y and B-Y are converted into analog color difference signals R-Y and B-Y by D/A converters 15 and 16, respectively. In this case, a clock signal CK2 of 10.52 MHz is supplied from the scanning line converter 4 to the D/A converter 14 as a sampling clock signal and a clock signal CK3 of 5.26 MHz is supplied from the scanning line converter 4 to the D/A converters 15 and 16 as a sampling clock signal, for the reason mentioned previously.

The analog color difference signal R-Y is supplied to a multiplier 21 and the analog color difference signal B-Y is supplied to a multiplier 22. An oscillator 17 outputs a sine wave signal 18 having a color subcarrier frequency fsc (=3.579545 MHz). The sine wave signal 18 is supplied to the multiplier 22 and a phase advancer 19. The phase advancer 19 advances the phase of the sine wave signal 18 by 90 degrees with respect to the subcarrier of the color difference signal B-Y and a resulting sine wave signal 20 is supplied to the multiplier 21.

The multiplier 21 performs a balanced modulation of the color difference signal R-Y by the sine wave signal 20 and the multiplier 22 performs a balanced modulation of the color difference signal B-Y by the sine wave signal 18. The balance-modulated color difference signals outputted respectively from the multipliers 21 and 22 and having a phase difference of 90 degrees from each other are added to each other by an adder 23 and outputted therefrom as a carrier chrominance signal.

Thus, the conventional television receiver can receive the analog component video signal.

In the conventional video signal processing circuit, the digital component video signal is converted into an analog signal and, thereafter, analog color difference signals are converted into a carrier chrominance signal by an analog circuit, as mentioned before. Since it is difficult to arrange a digital system and an analog system in a single IC chip (integrated circuit) in a mixed state, the conventional video signal processing circuit is not suitable for a high density integration and it would be a source of increased cost.

Further, since an analog circuit has a relatively large number of adjusting points and is vulnerable to noise and interference, its operation is relatively unstable.

SUMMARY OF THE INVENTION

The present invention has been made in view of these problems and has an object to provide a video signal processing circuit which can convert a digital color difference signal into a carrier chrominance signal, and operates stably and is suitable for high density integration for an IC chip.

According to the present invention, the above object can be achieved by a video signal processing circuit which processes first and second color difference signals, both sampled at an arbitrary and single sampling rate of first sampling clock signal, and produces a carrier chrominance signal, the processing circuit comprising a first flip-flop for latching the first sampling clock signal of the first and second color difference signals with a second sampling clock signal having a frequency which is an integer multiple of a subcarrier frequency of the carrier chrominance signal to be produced, second and third flip-flops for respectively latching the first and second color difference signals with a third sampling clock signal obtained from the first flip-flop, and carrier chrominance signal generating circuit for generating the carrier chrominance signal from the first and second color difference signals outputted from the second and third flip-flops.

DETAILED DESCRIPTION OF THE PREFERRED EMBODIMENT

Figure 1:
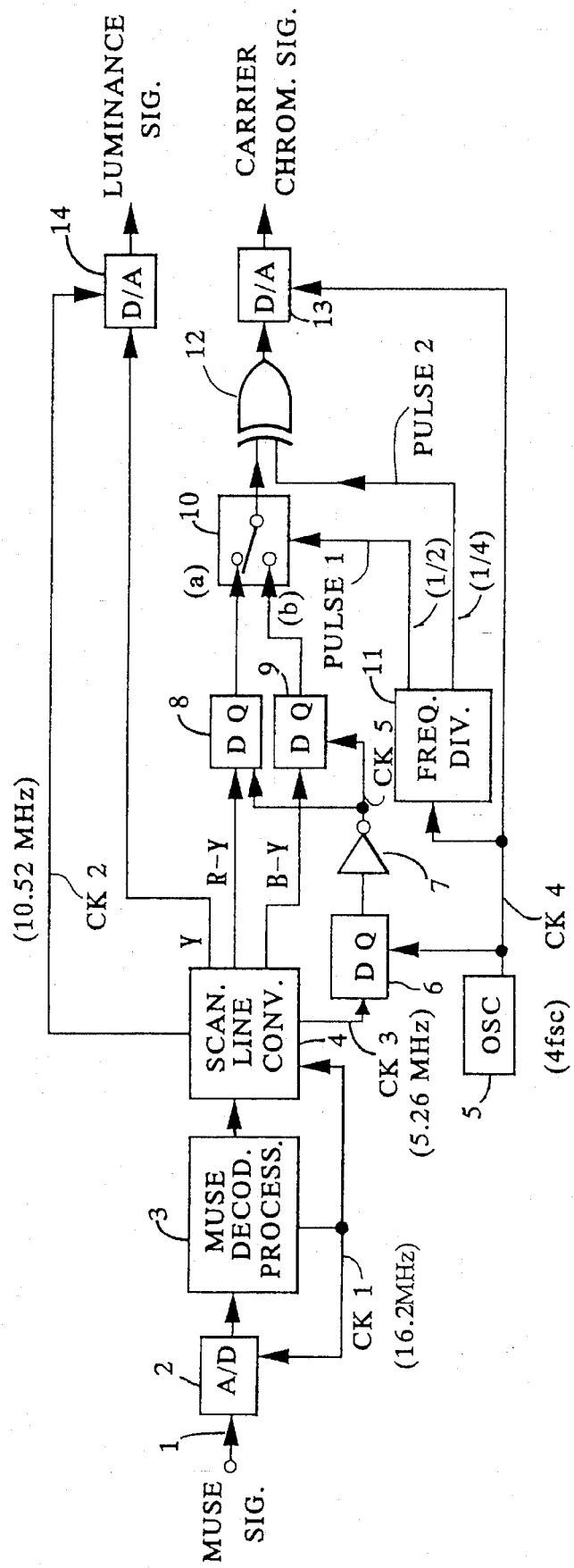
FIG. 1 is a block circuit diagram showing an embodiment of the present invention.
Figure 2:
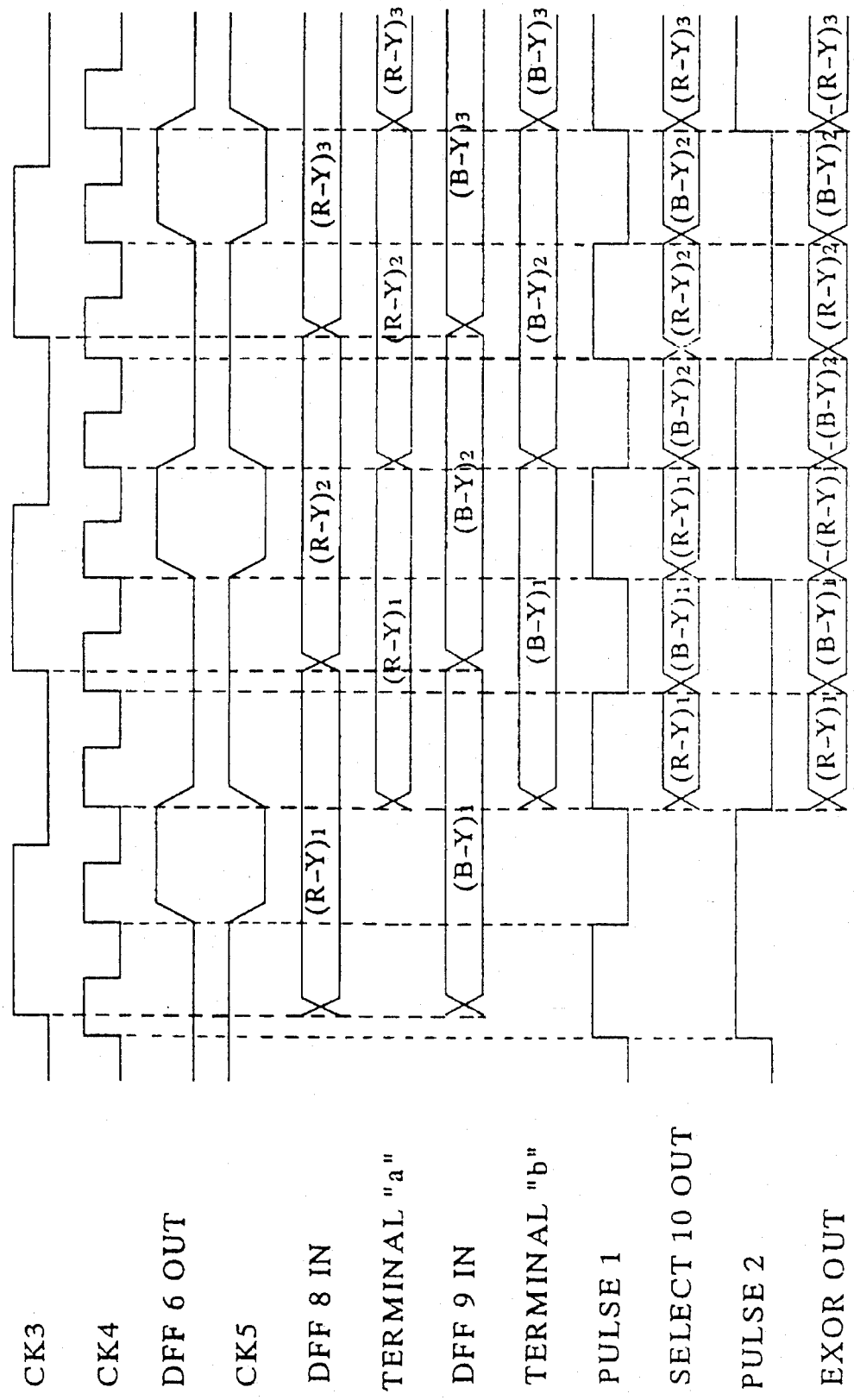
FIG. 2 shows waveforms for explaining an operation of the present invention.
Figure 3:
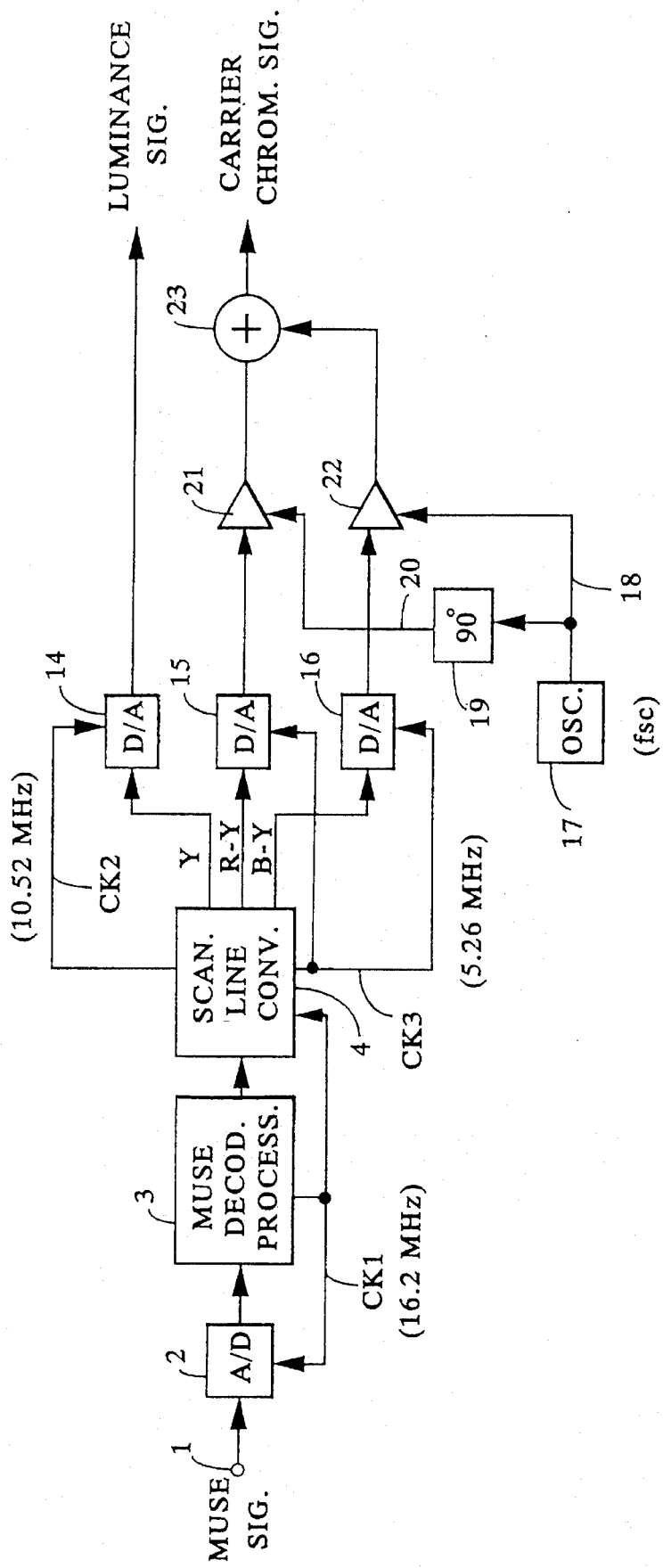
FIG. 3 is a block diagram showing a conventional circuit.
Figure 4:
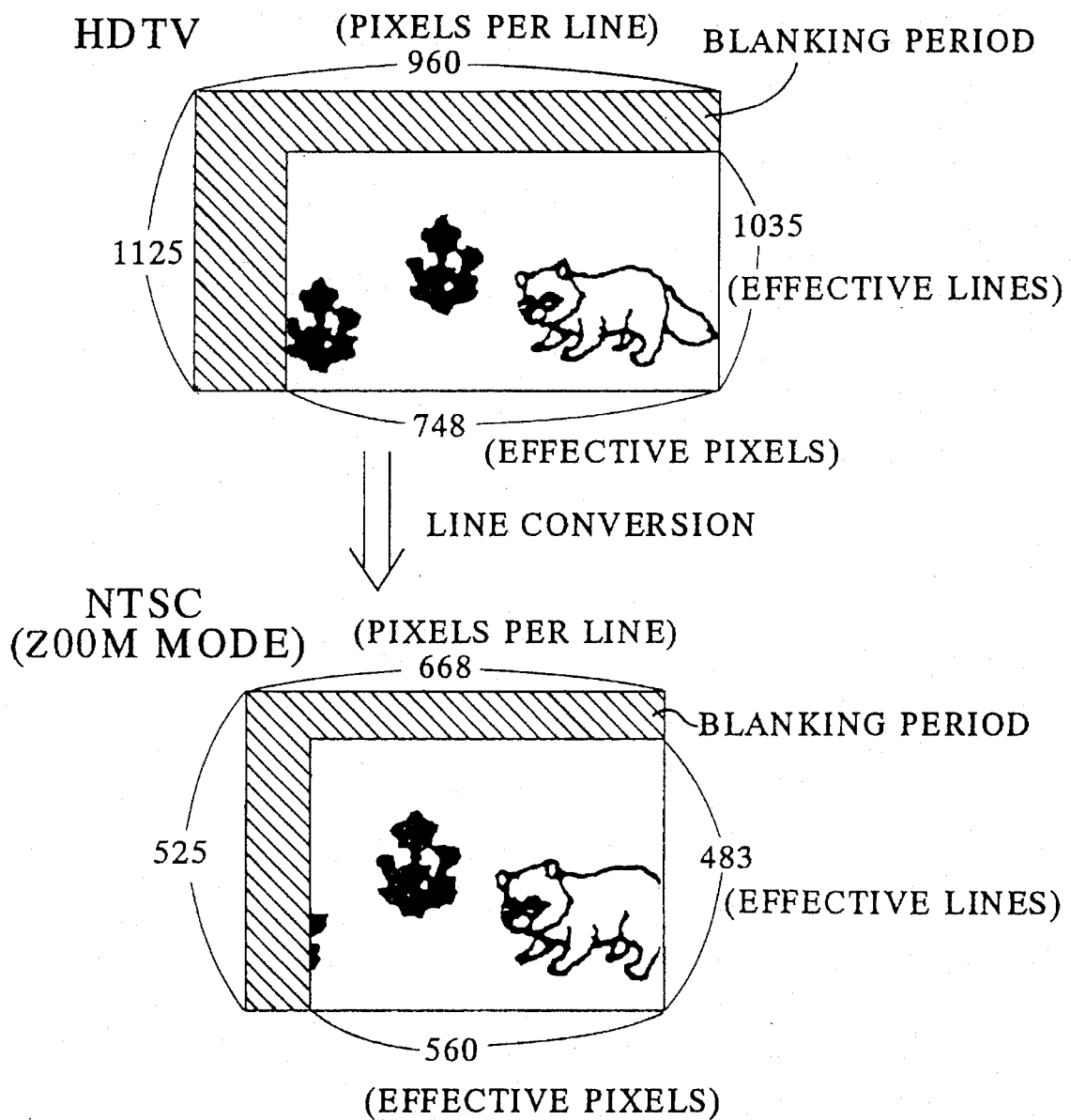
FIG. 4 shows an example of scanning line conversion.

A video signal processing circuit according to the present invention will be described with reference to FIGS. 1 and 2. FIG. 1 is a block circuit diagram showing an embodiment of the present invention and FIG. 2 shows waveforms for explaining an operation of the present invention. In FIG. 1, the same components as those in FIG. 3 are depicted by the same reference numerals, respectively.

In this specification, the video signal processing circuit for converting a digital component color television signal into a luminance signal and carrier chrominance signals which are receivable by a conventional NTSC television receiver takes in the form of an M-N converter.

In FIG. 1, a MUSE signal is supplied to an input terminal 1 from which it is supplied to an A/D converter 2. The A/D converter 2 is supplied with a clock signal CK1 of 16.2 MHz as a sampling clock signal. The MUSE signal at an output of the A/D converter 2, which is sampled and quantized at a rate of 16.2 MHz, is supplied to a MUSE decoding processor 3. Since the horizontal scanning frequency of the high definition television signal is 33.75 kHz, the MUSE signal sampled at the sampling rate of 16.2 MHz has a data of 480 pixels per 1H.

The MUSE decoding processor 3 decodes the input digital MUSE signal and outputs it as the high definition digital television signal whose video signal frequency band is restored. In this example, the sampling rate becomes 32.4 MHz by this decoding processing and the number of pixels in 1H becomes 960. Further, the number of effective image pixels in 1H is 748 which is about 78% of 960 pixels.

The high definition digital television signal outputted from the MUSE decoding processor 3 is supplied to a scanning line converter 4 in which the horizontal scanning period and the number of scanning lines are converted, resulting a digital luminance signal Y and digital color difference signals R-Y and B-Y sampled at a rate of CK3 i.e. 5.26 MHz.

The conversion of the color difference signals into the carrier chrominance signal can be realized by a bi-phase quadrature modulation using the color subcarrier frequency "fsc" of the carrier chrominance signal. This is possible if the sampling rate of the color difference signals is converted into an integer multiple of the color subcarrier frequency "fsc". In this regard, the sampling rate of the color difference signals is intended to be converted into a rate of clock signal CK4 generated by an oscillator 5 and having a frequency 4 times the color subcarrier frequency "fsc". Here, according to the sampling theory, the frequency of the clock signal CK4 should be at least twice that of color difference signals R-Y and B-Y. In case of converting the MUSE signal in to the NTSC format, the frequency of the clock signal CK4 is selected to be 14.32 MHz (3.58 MHz×4).

On the other hand, the color difference signals R-Y and B-Y outputted from the scanning line converter 4 are already sampled by the clock signal CK3, therefore, it is not preferable to directly convert them into the frequency of the clock signal CK4 which is not synchronized with and has a different frequency from the clock signal CK3 of 5.26 MHz, if did, it would cause an erroneous operation in the succeeding data processing.

For this reason, a clock signal CK5 with which the color difference signals R-Y and B-Y are latched respectively by D flip-flops (referred to as DFFs hereinafter) 8 and 9, is produced as such that the clock signal CK3 is latched at a DFF 6 with the clock signal CK4 and inverting a polarity of output of the DFF 6 by an inverter 7, so that a phase of the clock signal CK5 becomes to have a synchronizable relation with the clock signal CK4 for secure operation in the succeeding stages.

In more detail, as shown in FIG. 2, there is a possibility that a transition point of the color difference signals R-Y and B-Y inputted to the DFFs 8 and 9 becomes very close to a rising edge of a signal outputted from the DFF 6. Therefore, it is impossible to directly use the output signal of the DFF 6 as a clock signal for the DFFs 8 and 9 and the phase of the output signal of the DFF 6 needs to be readjusted. In this embodiment, the phase is inverted by the inverter 7, as a result, the rising edge of the clock signal CK5 and the transition point of the signals inputted to the DFFs 8 and 9 are separated by a predetermined distance, and also, the clock signal CK5 has the synchronizable relation with the clock signal CK4 although the frequencies thereof may be different each other. This makes the data (B-Y and R-Y) latched in the DFF 8 and 9 have a sampling rate which can be synchronized with 4 fsc. Therefore, these data can be processed, in the subsequent stages, with a clock signal or pulses having a rate being an integer multiple of 4 fsc.

The outputs of the DFFs 8 and 9 are inputted to input terminals "a" and "b" of a selector 10, respectively. The selector 10 is switched as follows. The clock signal CK4 is supplied to a frequency divider 11 which outputs a pulse 1 having a period of 2 fsc which is a half of that of the clock signal CK4 and has a duty cycle of 50% and a pulse 2 having a period of fsc which is one fourth of that of the clock signal CK4 and has a duty cycle of 50%, as shown in FIG. 2. The pulse 1 from the frequency divider 11 is supplied to the selector 10 which selects the color difference signal R-Y inputted to the input terminal "a" when the pulse 1 is high and selects the color difference signal B-Y inputted to the input terminal "b" when the pulse 1 is low. As a result, the selector 10 outputs data of the color difference signals R-Y and B-Y in a dot sequence as shown in FIG. 2.

Further, the output of the selector 10 is supplied to an EXOR circuit 12 in which a logical addition (exclusive OR) of the selector output and the pulse 2 from the frequency divider 11, is performed. When the pulse 2 is in a low level, the EXOR circuit 12 outputs the output signal of the selector 10 as it is and, when it is in a high level, an inversion of the input signal is outputted.

Therefore, the EXOR circuit 12 outputs the color difference signals R-Y and B-Y which are inverted at a period of 2 fsc, in a dot sequence at the sampling rate of 4 fsc. This signal equals to the color difference signals R-Y and B-Y modulated by the biphase quadrature modulation with the subcarrier frequency fsc having its phase shifted by 90 degrees. Thus, the combination of the selector 10 and the EXOR circuit 12 is an example of a carrier chrominance signal generating circuit for generating a digital carrier chrominance signal from a pair of digital color difference signals. Further, the EXOR circuit 12 is an example of an inverter circuit for inverting the output of the selector 10 every predetermined period.

The output signal of the EXOR circuit 12 is converted into an analog signal by a D/A converter 13 having the clock signal CK4 as a sampling clock signal and an analog format signal is outputted as an analog carrier chrominance signal. On the other hand, the digital luminance signal from the scanning line converter 4 is converted into an analog signal by a D/A converter 14 with the clock signal CK2 as a sampling clock signal and the analog format signal is outputted as an analog luminance signal.

Thus, the analog luminance and carrier chrominance signals are obtained, which can be received by conventional television receivers.

As described, the video signal processing circuit according to the present invention can convert the digital color difference signals of a digital component color television signal into the analog carrier chrominance signal capable of being received by a conventional NTSC color television receiver by performing the sampling rate conversion with a simple circuit construction. Therefore, there is substantially no need of using an analog circuit arrangement which is vulnerable to noise and interference and requires positive adjustments.

Thus, the video signal processing circuit of the present invention is suitable for high density circuit integration and is operable stably.

As described in detail hereinbefore, the video signal processing circuit according to the present invention comprises a first flip-flop DFF 6 for latching a first sampling clock signal (CK3) of a first and second color difference signals R-Y and B-Y sampled at an arbitrary single sampling rate with a second clock signal (CK4) having frequency an integer multiple of a color subcarrier frequency, a second and third flip-flops (DFFs 8 and 9) for latching the first and second color difference signals with a third clock signal (CK5) obtained from the first flip-flop and a carrier chrominance signal generating circuit (10, 12) for generating a carrier chrominance signal from color difference signals outputted from the second and third flip-flops. Therefore, it is possible to simply convert the digital color difference signals into the carrier chrominance signal directly and there is substantially no need of using analog circuits which are vulnerable to noise and interference, and requires adjustments in production. Thus, the video signal processing circuit of the present invention is suitable for high density circuit integration, possible to substantially reduce cost and is operable stably.

Further, when the carrier chrominance generating circuit is constructed with a selector 10 which selects and outputs one of the color difference signals outputted respectively from the second and third flip-flops and an inversion circuit, for example, the EXOR circuit 12, for inverting an output of the selector 10 at predetermined period, it is possible to generate the carrier chrominance signal from the color difference signals with such a simple circuit construction.

Further, when an inverter 7 is provided between the first flip-flop and the second and third flip-flops and the third clock signal (CK5) is obtained by inverting the clock signal outputted from the first flip-flop, it becomes possible to prevent a latching failure.

What is claimed is:

1. A video signal processing circuit for processing first and second color difference signals, both of which are sampled at a single sampling rate of first sampling clock signal, and for producing a carrier chrominance signal, said processing circuit comprising:

a first flip-flop for latching said first sampling clock signal of said first and second color difference signals with a second sampling clock signal having a frequency which is an integer multiple of a subcarrier frequency of said carrier chrominance signal to be produced;

second and third flip-flops for respectively latching said first and second color difference signals with a third sampling clock signal obtained from said first flip-flop; and carrier chrominance signal generating means for generating said carrier chrominance signal from said first and second color difference signals outputted from said second and third flip-flops.

2. The video signal processing circuit claimed in claim 1, wherein said carrier chrominance signal generating means comprises a selector for selectively switching and outputting said first and second color difference signals respectively outputted from said second and third flip-flops and an inverter for inverting a polarity of an output of said selector every predetermined period.

3. The video signal processing circuit claimed in claim 2, wherein said inverter is an EXOR circuit.

4. The video signal processing circuit claimed in claim 1, wherein said third sampling clock signal is a polarity inverted output from said first flip-flop.

5. The video signal processing circuit claimed in claim 2, wherein said third sampling clock signal is a polarity inverted output from said first flip-flop.

6. The video signal processing circuit claimed in claim 3, wherein said third sampling clock signal is a polarity inverted output from said first flip-flop.

* * * * *